United States Patent [19]
Redinger

[11] Patent Number: 6,142,420
[45] Date of Patent: Nov. 7, 2000

[54] LANDING GEAR PAD ASSEMBLY AND METHOD OF REDUCING LOADING OF FASTENERS UPON INSTALLATION THEREOF

[75] Inventor: William Scott Redinger, Erie, Pa.

[73] Assignee: Lord Corporation, Cary, N.C.

[21] Appl. No.: 09/225,935

[22] Filed: Jan. 6, 1999

[51] Int. Cl.[7] .................................................. B64C 25/64
[52] U.S. Cl. ...................... 244/100 R; 244/108; 267/141
[58] Field of Search ............................ 244/17.17, 100 R, 244/104 R, 108; 267/141, 141.3, 141.7

[56] References Cited

U.S. PATENT DOCUMENTS

| | | | |
|---|---|---|---|
| 2,539,817 | 1/1951 | Ditter | 280/28 |
| 2,741,446 | 4/1956 | Jakimiuk | 244/108 X |
| 2,755,056 | 7/1956 | Hutton | 267/141.7 |
| 4,645,143 | 2/1987 | Coffy | 244/100 R |
| 5,265,552 | 11/1993 | Taylor | 267/141 X |
| 5,551,661 | 9/1996 | Bunker | 267/141 X |

*Primary Examiner*—Robert P. Swiatek
*Attorney, Agent, or Firm*—Randall S. Wayland; Michael M. Gnibus

[57] ABSTRACT

An elastomer landing gear pad assembly (20) and method of reducing loading of installation fasteners (17) including a cap (15) and an elastomer pad (21) including a crown (22) on at least one edge thereof extending between the top (26) and at least one of the peripheral sides (24). Upon tightening the fasteners (17), the crown (22) comes into progressive contact with the contact surface thereby compressing the pad (21). The crown minimizes stress buildup in the fasteners upon substantial compression of the pad.

15 Claims, 5 Drawing Sheets

LANDING GEAR PAD ASSEMBLY AND METHOD OF REDUCING LOADING OF FASTENERS UPON INSTALLATION THEREOF

FIELD OF THE INVENTION

The invention relates to elastomer pads. More particularly, the present invention is directed to a method and apparatus for reducing loading in fasteners used to compress such elastomer pads.

BACKGROUND OF THE INVENTION

Elastomer pads are oftentimes used to secure a first structural member, such as a helicopter cross tube, in place relative to a second structural member, such as a helicopter fuselage. As shown in Prior Art FIGS. 1a–1b, a landing gear pad assembly 10 is shown where the landing gear assembly 10 compresses the landing gear cross tube 12 against the underside 14a of the fuselage structure 14 to secure it in place. The prior art landing gear assembly 10 includes a cap 15 and a rectangular shaped elastomer pad 16 bonded to an upper side 15a thereof as shown in FIG. 1b. Upon insertion of the fastener bolts 17 through holes 18 in cap 15 and tightening into threaded holes 19 formed in the fuselage 14, the pad 16 becomes compressed between the underside of cross tube 12 and upper side 15a of cap 15 thereby bulging the elastomer pad 16 as shown in FIG. 1a. This axial precompression of the pad 16 loads the cross tube 12 and secures it in place relative to the fuselage 14.

Examples of other prior art helicopter landing gear assemblies including elastomer pads may be found in U.S. Pat. No. 2,539,817 to Ditter, and U.S. Pat. No. 4,645,143 to Coffy.

Although, in general, these prior art elastomer pad assemblies have adequate performance, their installation may lead to undue stresses being applied to the attachment fasteners. Accordingly, there has been a long felt, and unmet need for a landing gear assembly which is capable of being installed without overstressing the fasteners.

SUMMARY OF THE INVENTION

The present invention is an improved elastomer landing gear pad assembly and method for reducing the stress in the fasteners securing such pad assembly to an aircraft fuselage. The elastomer landing gear pad assembly dramatically reduces the stress applied to the fasteners during installation.

In a preferred aspect, the invention is a landing gear pad assembly adapted to be fastened to a fuselage by way of fasteners to secure a landing gear cross tube to the fuselage, comprising: a rigid cap adapted to be mounting to said fuselage by said fasteners, an elastomer pad including a top and peripheral sides, said elastomer pad received on an upper surface of said cap, said elastomer pad including an edge crown extending from at least one of said peripheral sides to said top wherein upon installation, said top first engages said cross tube and upon progressively applying tightening torque to said bolts, said edge crown progressively engages said cross tube resulting is lessened stresses in said fasteners as a result of tolerance stack ups.

In accordance with the invention, a method is provided for reducing stresses in fasteners used to fasten a landing gear pad assembly to a fuselage to secure a landing gear cross tube in place relative to the fuselage, comprising the steps of: providing a rigid cap on said assembly, said cap adapted to be mounting to said fuselage by said fasteners, providing an elastomer pad on said assembly, said elastomer pad including a top and peripheral sides, said elastomer pad received on an upper surface of said cap, forming an edge crown on said elastomer pad which extends from at least one of said peripheral sides to said top, and installing said assembly to said fuselage by tightening said fasteners causing said top to first engage said cross tube and upon progressively applying tightening torque to said fasteners, said edge crown progressively engages said cross tube resulting in lessened stresses in said fasteners as a result of tolerance stack ups.

According to another aspect, the invention is an elastomer pad assembly adapted to be fastened to a first structure by way of fasteners to securing a second structure to the first structure, comprising: a rigid cap adapted to be mounting to said first structure by said fasteners, and an elastomer pad received on an upper surface of said cap, said elastomer pad including a top and peripheral sides, said elastomer pad including an edge crown extending from at least one of said peripheral sides to said top wherein upon installation, said top first engages said second structure and upon progressively applying tightening torque to said fasteners, said edge crown progressively engages said second structure resulting is lessened stresses in said fasteners as a result of tolerance stack ups.

In a general aspect, the invention is an elastomer pad assembly adapted to be fastened to a first structure by way of one or more fasteners to restrain motion of a second structure relative to the first structure, comprising: a rigid cap adapted to be mounted to said first structure by said fasteners, and an elastomer pad received between one of an engagement surface on said first structure and an engaging surface on said second structure or an engagement surface on said cap and an engaging surface on said second structure, said elastomer pad including a top and peripheral sides, said elastomer pad including an edge crown extending from at least one of said peripheral sides to said top wherein upon installation, said top first engages one of said engaging and said engagement surfaces and upon progressively applying tightening torque to said fasteners, said edge crown progressively engages said surface resulting in lessened stresses in said fasteners as a result of tolerance stack ups.

The landing gear pad assembly in accordance with the invention advantageously accommodates larger manufacturing tolerances of the assembled components as compared to prior art pad assemblies.

Moreover, the assembly advantageously provides a non-linear spring rate characteristic.

Further, the assembly advantageously provides substantially equivalent spring rate as compared to a prior art pad in the as installed condition.

Additionally, the assembly advantageously reduces stresses applied to the assembly fasteners during installation.

The above-mentioned and further features, advantages, and characteristics of the present invention will become apparent from the accompanying descriptions of the preferred embodiments and attached drawings.

BRIEF DESCRIPTION OF THE DRAWINGS

The invention will become better understood by reference to the description that follows, in conjunction with the appended drawings, in which.

DETAILED DESCRIPTION OF THE PREFERRED EMBODIMENT

Figure 2:
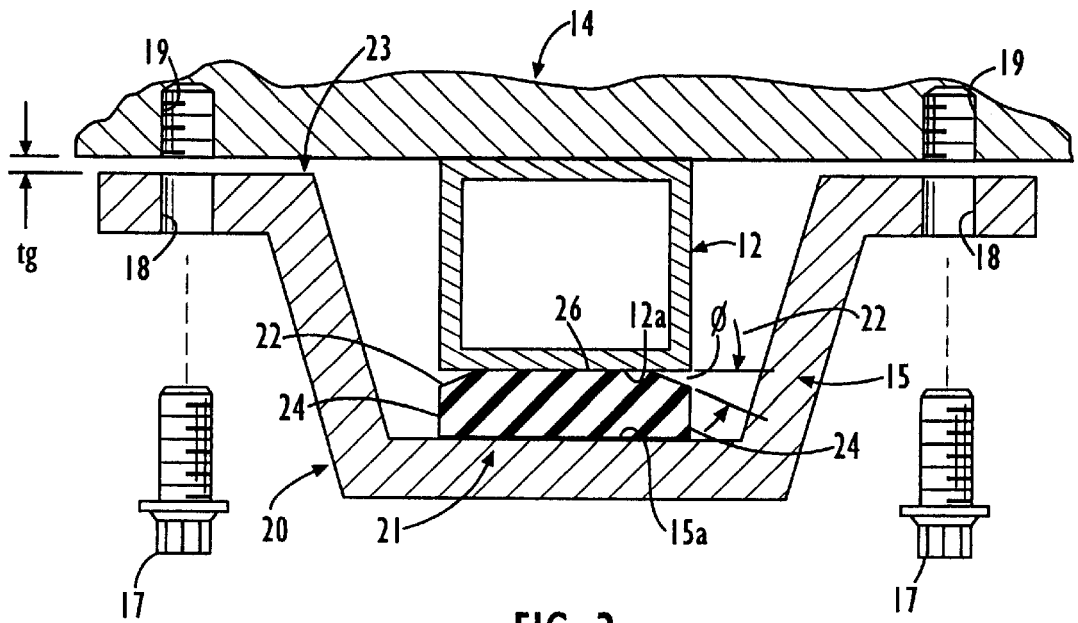
FIG. 2 is a sectioned side view of a first embodiment of landing gear pad assembly according to the invention shown in an uncompressed, unassembled condition.

A landing gear pad assembly 20 according to the invention is first illustrated in FIG. 2. This assembly 20 provides adequate compressive stiffness such that when the assembly is securely clamped to the fuselage 14, the assembly 20 secures the landing gear cross tube 12 in place relative thereto. The assembly 20 includes a cap 15 and an elastomer pad 21. The cap 15 is manufactured from a rigid material, such as aluminum or steel and includes a plurality of holes 18 formed therethrough which receive fastener bolts 17 therethrough. The bolts 17 fasten the cap 15 to the fuselage structure 14 by threading into corresponding threaded holes 19. In this embodiment, the pad 21 is received between the under side 12a of the cross tube 12 and the topside 15a of the cap 15; the pad 21 being preferably bonded to the cap 15 via a conventional bonding operation.

Figure 1A:
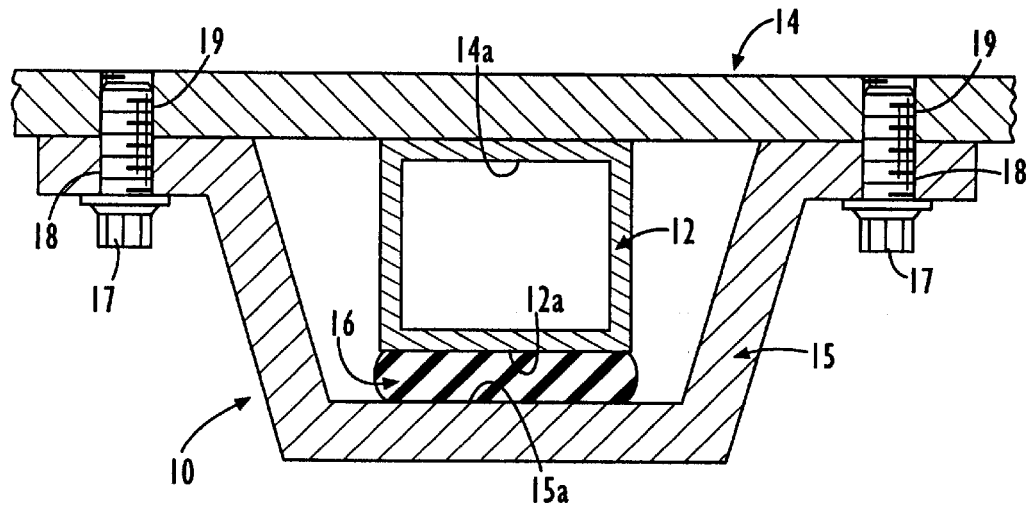
FIG. 1a is a partially cross-sectioned side view of a landing gear pad assembly according to the Prior Art shown in a compressed, assembled condition.
Figure 4:
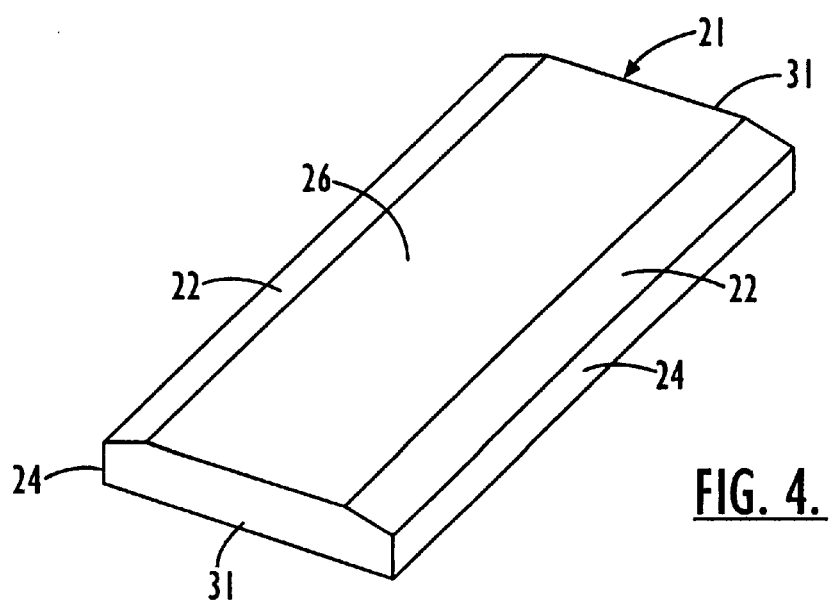
FIG. 4 is a perspective view of an elastomer pad of the landing gear pad assembly of FIGS. 2 and 3.

The pad 21 is preferably manufactured from an elastomer material, such as natural rubber, synthetic elastomer, or a blend thereof. Nitrile elastomers have found to be particularly effective because of their inherent resistance to oils and solvents. The pad 21 includes one or more crowns 22 extending between the planar top 26 of the pad 21 and its peripheral sides 24 as best shown in FIG. 4. Preferably, the crown extends along both sides 24, but may also extend along the ends (not shown). In the uninstalled condition as shown in FIG. 2, a gap 23 of thickness tg exists between the cap 15 and the fuselage 14. This gap is determined by the combination of the desired compression of the pad and any tolerance stack up in the manufactured components, i.e., the pad, cross tube 12, cap 15 and fuselage 14. For example, if all the tolerances are at their highest, then the amount of precompression of the pad 21 is maximized. Such conditions, if they exist in the prior art assembly of FIG. 1a, may lead to unacceptably high bolt stresses.

Figure 1B:
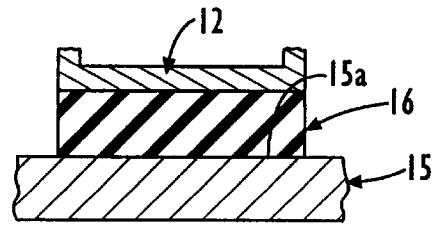
FIG. 1b is a partially cross-sectioned side view of a landing gear pad assembly according to the Prior Art shown in an uncompressed, unassembled condition.

However, the addition of the crowns 22 on the pads 21 in the present invention allows the closing of the gap 23 with the resultant effect that the bolts 17 are subjected to dramatically reduced tension stresses as compared to an uncrowned pad 16 shown in FIG. 1b. Notably, in the installed state, the assembly according to the present invention looks identical to the compresses prior art assembly of FIG. 1a, i.e., the crown comes into complete contact with the underside 12a of the cross tube 12.

Figure 9:
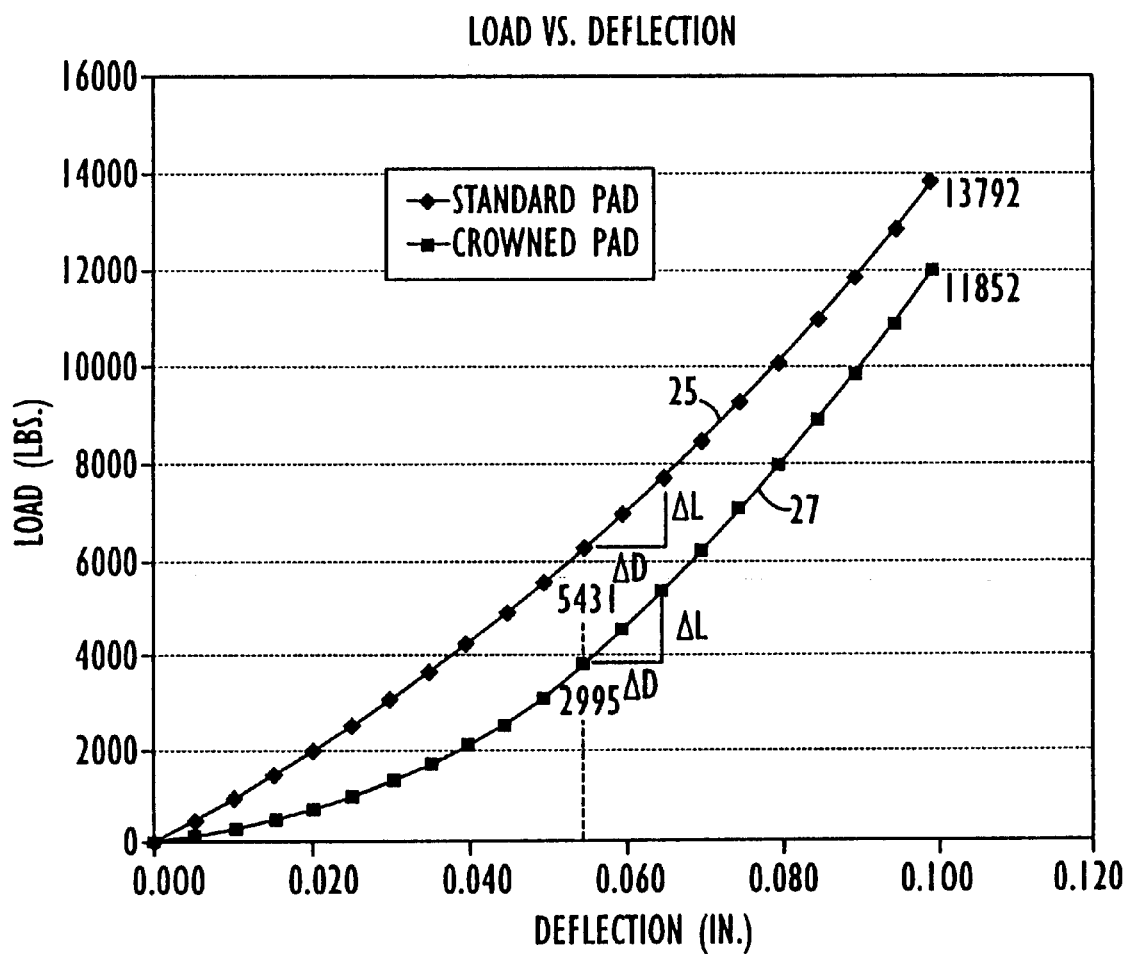
FIG. 9 is a performance plot of a representative embodiment of landing gear pad assembly according to the invention as compared to the prior art standard pad.

Preferably, the crown 22 comprises a taper which extends from the top 26 at an angle $\phi$ of about 6 degrees. Other angles may be used as well. Upon tightening the bolts 17, more and more of the crown 22 comes into contact with the underside 12a of the cross tube 12. Preferably, all the crown 22 is in contact with the under side 12a upon closing the gap 23. As can be seen in FIG. 9, the loads in the pad assembly 20 at the designed precompression (due to tolerance stack up) is approximately 45% lower in the pad 21 according to the present invention as designated by line 27 than a prior art uncrowned pad 16 of the same overall thickness and rectangular shape as designated by line 25. It should be noted, however, that the spring rate (as designated by the $\Delta D$—change in displacement divided by the $\Delta L$—change in load) is approximately equal for the prior art pad 16 and the crowned pad 21. Therefore, it should be recognized that for a substantially equivalent stiffness, the crowned pad 21 results in dramatically lower tension loads in the fasteners 17, i.e., about 45% lower. Although a tapered crown is shown, crowns of other shapes, such as a generous radius, may be included as well, as long as the crown 22 is of sufficient dimension to relieve the fastener loads.

Figure 3:
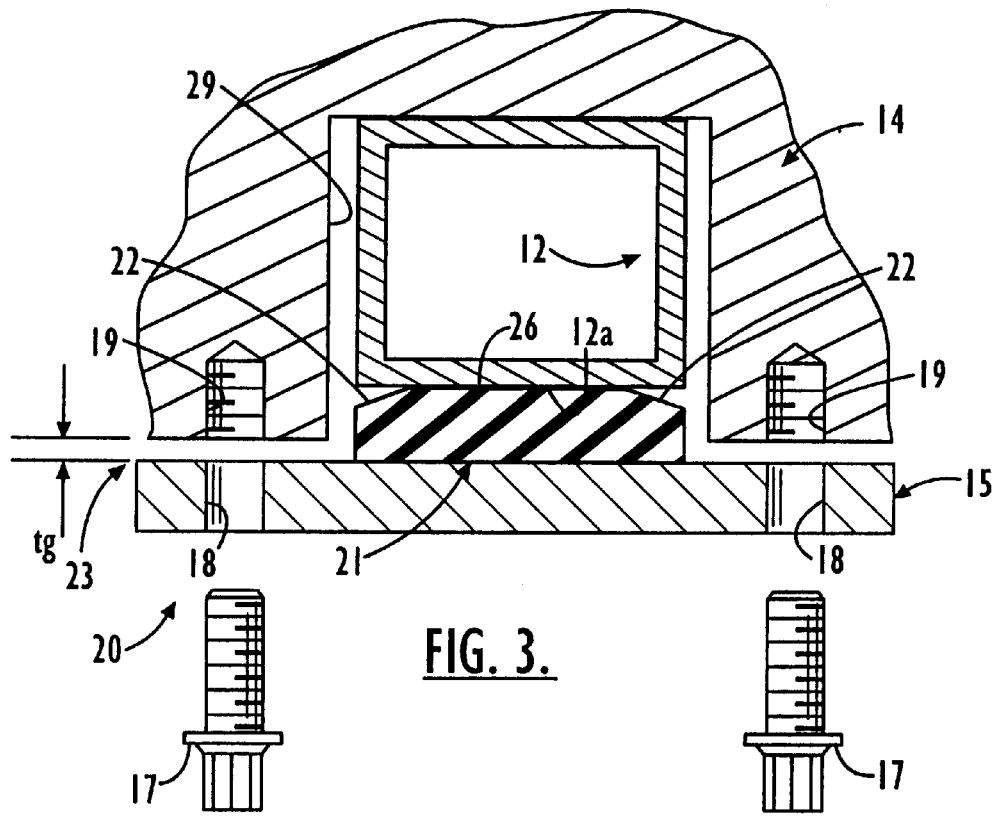
FIG. 3 is a sectioned side view of a second embodiment of landing gear pad assembly according to the invention shown in the uncompressed, unassembled condition.

FIG. 3 illustrates a second embodiment of the assembly 20 according to the invention. In this case, the cap 15 is formed of a planar plate and the cross tube 12 is received in a channel 29 formed in the fuselage 14. As in the previous embodiment, the crown 22 and top side 26 come into substantial contact with the underside 12a of cross tube 12 upon closing the gap 23 of thickness tg by insertion of fastener bolts 17 through holes 18 and tightening them into threaded holes 19.

Figure 5:
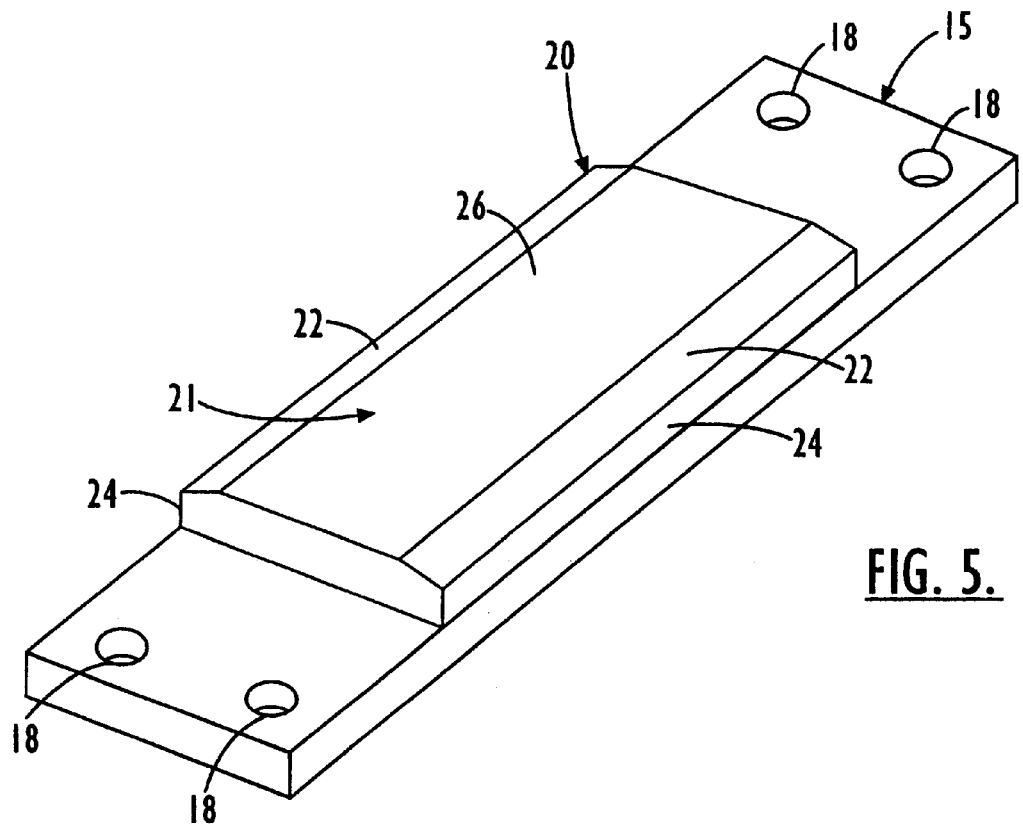
FIG. 5 is a perspective view of a third embodiment of landing gear pad assembly according to the invention.
Figure 6:
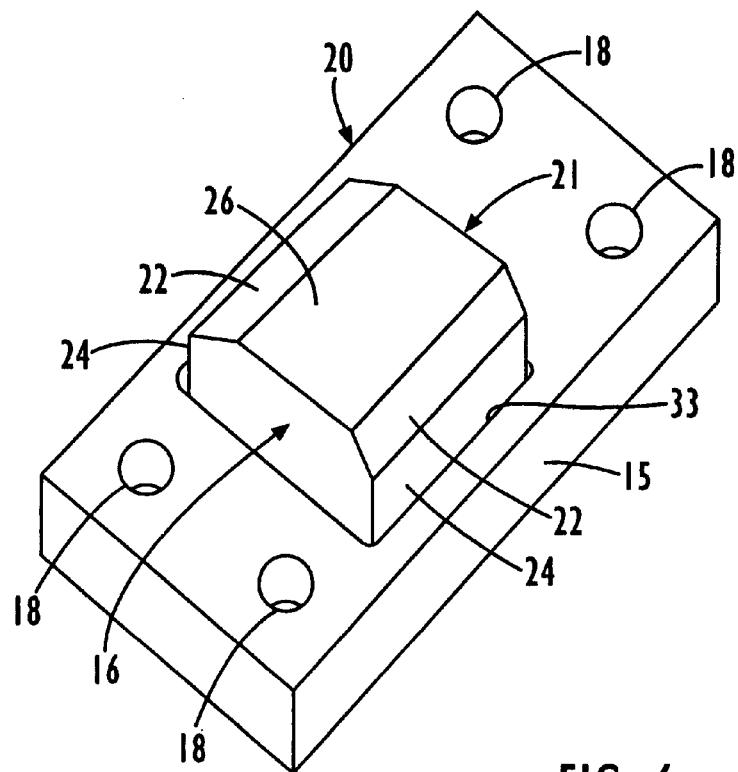
FIG. 6 is a perspective view of a fourth embodiment of landing gear pad assembly according to the invention.

FIGS. 5 and 6 illustrate third and fourth embodiments of the assembly 20 according to the invention. In the FIGS. 5 and 6 embodiments, the crowns 22 are oriented along the length of the cap 15. In the FIG. 6 embodiment, the pad 21 is received within a pocket 33 formed in the top side of cap 15. Preferably, the pad is unbonded to the cap; the pocket 33 maintaining the positional relationship between the cap 15 and pad 21. Alternatively, it may be desirable to cold bond the pad 21 to the cap 15.

Figure 7:
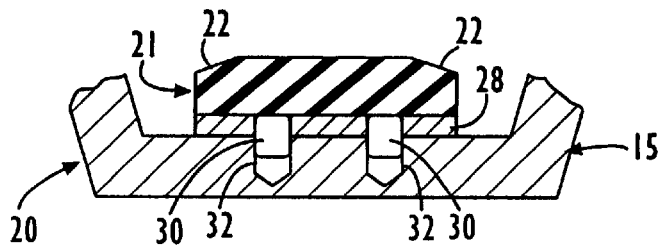
FIG. 7 is a partial cross-sectioned side view of a fifth embodiment of landing gear pad assembly according to the invention.
Figure 8:
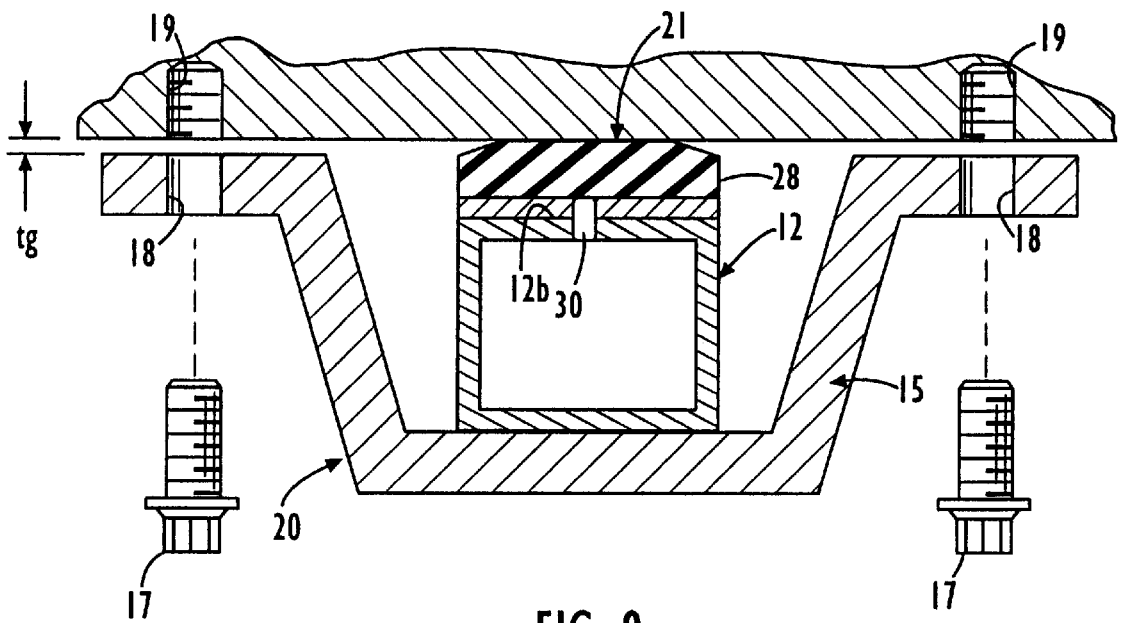
FIG. 8 is a cross-sectioned side view of a sixth embodiment of landing gear pad assembly according to the invention.

FIGS. 7 and 8 illustrate fifth and sixth embodiments of the assembly 20 according to the invention. In each case, the pad 21 is bonded to a plate 28 to facilitate easy removal of the pad 21 for changeout when its useful life is exceeded. One or more pins 30 are pressed into the plate 28 or otherwise secured thereto. In the FIG. 7 embodiment, the pins 30 are received in like sized holes 32 or other restraining means formed in cap 15 to maintain the position of the pad relative thereto. In the FIG. 8 embodiment, the pad 21 is mounted to the top side 12b of the cross tube 12 by means of a pin(s) 30. Tightening the bolts 17 in this embodiment restrains movement of the cross tube 12 relative to the cap 15. Alternatively, pads may be included on both the underside and topside of the cross tube 12.

The invention has been described in terms of preferred structure, however, the particular examples given are meant to be illustrative and not limiting. Substitutions and equivalents as will occur to those skilled in the art are included within the scope of the invention as defined by the following claims.

What is claimed is:

1. A landing gear pad assembly adapted to be fastened to a fuselage by way of fasteners to secure a landing gear cross tube to said fuselage, comprising:

a) a rigid cap adapted to be mounted to said fuselage by said fasteners, and b) an elastomer pad including a top and peripheral sides, said elastomer pad received on an upper surface of said cap, said elastomer pad including an edge crown extending from at least one of said peripheral sides to said top wherein upon installation, said top first engages said cross tube and upon progressively applying tightening torque to said fasteners, said edge crown progressively engages said cross tube resulting in lessened stresses in said fasteners as a result of tolerance stack ups.

2. The landing gear pad assembly of claim 1 wherein said edge crown comprises a taper.

3. The landing gear pad assembly of claim 2 wherein said taper angles away from the top by about a six degree angle.

4. The landing gear pad assembly of claim 3 wherein said taper intersects at least one of said peripheral sides a distance down from said top, said distance being less than the maximum tolerance stack up.

5. The landing gear pad assembly of claim 1 wherein said crown is included on at least two peripheral sides.

6. The landing gear pad assembly of claim 1 wherein said elastomer pad comprises a rectangular shape.

7. The landing gear pad assembly of claim 1 wherein said elastomer pad is bonded to said cap.

8. The landing gear pad assembly of claim 1 wherein said elastomer pad is unbonded to said cap.

9. The landing gear pad assembly of claim 1 wherein said elastomer pad is received in a pocket formed in said cap.

10. The landing gear pad assembly of claim 1 wherein said elastomer pad comprises a plate.

11. The landing gear pad assembly of claim 10 wherein said elastomer pad is bonded to the plate, and wherein at least one pin is pressed into the plate.

12. The landing gear pad assembly of claim 1 wherein said elastomer pad comprises a nitrile elastomer.

13. A method for reducing stresses in fasteners used to fasten a landing gear pad assembly to a fuselage to secure a landing gear cross tube in place relative to the fuselage, comprising the steps of:

a) providing a rigid cap on said assembly, said cap adapted to be mounted to said fuselage by said fasteners, b) providing an elastomer pad on said assembly, said elastomer pad including a top and peripheral sides, said elastomer pad received on an upper surface of said cap, c) forming an edge crown on said elastomer pad which extends from at least one of said peripheral sides to said top, and d) installing said assembly to said fuselage by tightening said fasteners causing said top to first engage said cross tube and upon progressively applying tightening torque to said fasteners, said edge crown progressively engages said cross tube resulting is lessened stresses in said fasteners as a result of tolerance stack ups.

14. An elastomer pad assembly adapted to be fastened to a first structure by way of fasteners to secure a second structure to the first structure, the elastomer pad assembly comprising:

a) a rigid cap adapted to be mounted to said first structure by said fasteners, and b) an elastomer pad received on an upper surface of said cap, said elastomer pad including a top and peripheral sides, said elastomer pad including an edge crown extending from at least one of said peripheral sides to said top wherein upon installation, said top first engages said second structure and upon progressively applying tightening torque to said fasteners, said edge crown progressively engages said second structure resulting is lessened stresses in said fasteners as a result of tolerance stack ups.

15. An elastomer pad assembly adapted to be fastened to a first structure by way of one or more fasteners to restrain motion of a second structure relative to the first structure, the elastomer pad assembly comprising:

a) a rigid cap adapted to be mounted to said first structure by said fasteners, and b) an elastomer pad receivable between one of an engagement surface on said first structure and an engaging surface on said second structure or an engagement surface on said cap and an engaging surface on said second structure, said elastomer pad including a top and peripheral sides, said elastomer pad including an edge crown extending from at least one of said peripheral sides to said top wherein upon installation, said top first engages one of said engaging and said engagement surfaces and upon progressively applying tightening torque to said fasteners, said edge crown progressively engages said surface resulting is lessened stresses in said fasteners as a result of tolerance stack ups.

* * * * *